(12) United States Patent
Myhre

(10) Patent No.: US 9,665,413 B2
(45) Date of Patent: May 30, 2017

(54) SHARED JOB SCHEDULING IN ELECTRONIC NOTEBOOK

(75) Inventor: Nathaniel M. Myhre, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 427 days.

(21) Appl. No.: 12/433,907

(22) Filed: May 1, 2009

(65) Prior Publication Data
US 2010/0281484 A1 Nov. 4, 2010

(51) Int. Cl.
G06F 9/52 (2006.01)
G06F 9/54 (2006.01)
G06F 17/22 (2006.01)

(52) U.S. Cl.
CPC ............ *G06F 9/544* (2013.01); *G06F 9/526* (2013.01); *G06F 17/2288* (2013.01)

(58) Field of Classification Search
CPC ....... G06F 9/526; G06F 17/2288; G06F 17/24
USPC ......................................................... 718/102
See application file for complete search history.

(56) References Cited

U.S. PATENT DOCUMENTS

| | | | |
|---|---|---|---|
| 5,287,521 A * | 2/1994 | Nitta et al. ................... 710/200 |
| 5,623,659 A * | 4/1997 | Shi et al. |
| 6,529,905 B1 | 3/2003 | Bray et al. |
| 6,625,258 B1 | 9/2003 | Ram et al. |
| 6,687,257 B1 | 2/2004 | Balasubramanian |
| 6,757,871 B1 | 6/2004 | Sato et al. |
| 7,206,776 B2 | 4/2007 | Szilagyi et al. |
| 7,249,314 B2 | 7/2007 | Walker et al. |
| 7,343,432 B1 * | 3/2008 | Niver ...................... G06F 9/526 707/E17.007 |
| 7,899,883 B2 * | 3/2011 | Rasmussen et al. .......... 709/217 |
| 8,141,076 B2 | 3/2012 | Bates et al. |

(Continued)

FOREIGN PATENT DOCUMENTS

CN 1804836 A 7/2006
JP 08-255130 A 10/1996

(Continued)

OTHER PUBLICATIONS

"Backoff Definition". Obtained via http://dictionary.reference.com/browse/backoff. 1 page, May 28, 1996.*

(Continued)

*Primary Examiner* — Jacob A Petranek
(74) *Attorney, Agent, or Firm* — Talem IP Law, LLP

(57) ABSTRACT

Architecture that synchronizes a job to shared notebook eliminating the need for user intervention and guaranteeing that only one instance of the notebook client performs the task. A job tracking component creates and maintains tracking information of jobs processed against shared notebook information. A scheduling component synchronizes a new job against the shared notebook information based on the tracking information. The tracking information can be a file or cells stored at a root level of a hierarchical data collection that represents the electronic notebook. The file includes properties related to a job that has been processed. The properties are updated as new jobs are processed. Job scheduling includes whole file updates and/or incremental updates to the shared notebook information.

14 Claims, 11 Drawing Sheets

(56) References Cited

U.S. PATENT DOCUMENTS

| | | | |
|---|---|---|---|
| 2002/0065848 | A1 | 5/2002 | Walker et al. |
| 2002/0124057 | A1 | 9/2002 | Besprosvan |
| 2002/0174180 | A1 | 11/2002 | Brown et al. |
| 2003/0172185 | A1 | 9/2003 | Dezonno |
| 2004/0120560 | A1 | 6/2004 | Robar et al. |
| 2006/0004758 | A1 | 1/2006 | Teng et al. |
| 2006/0161516 | A1 | 7/2006 | Clarke et al. |
| 2007/0074212 | A1 | 3/2007 | Bates et al. |
| 2007/0255833 | A1 | 11/2007 | Sharma et al. |
| 2008/0184241 | A1 | 7/2008 | Headrick et al. |
| 2008/0288501 | A1 | 11/2008 | Bender |
| 2009/0006936 | A1 | 1/2009 | Parker et al. |
| 2009/0024673 | A1 | 1/2009 | Barker et al. |
| 2009/0031317 | A1 | 1/2009 | Gopalan et al. |
| 2009/0235181 | A1* | 9/2009 | Saliba ................ G06Q 10/10 715/753 |

FOREIGN PATENT DOCUMENTS

| | | | |
|---|---|---|---|
| JP | 2004-0454799 | A | 2/2004 |
| JP | 2004054799 | A | 2/2004 |
| JP | 2006-195972 | A | 7/2006 |
| JP | 2009-510614 | A | 3/2009 |
| JP | 2009510614 | | 3/2009 |
| RU | 2295752 | | 3/2007 |
| TW | 1229268 | | 3/2005 |
| TW | 200506677 | | 2/2015 |
| WO | WO 02/41571 | | 5/2002 |
| WO | 2007038458 | | 4/2007 |

OTHER PUBLICATIONS

"International Search Report", Mailed Date: Nov. 26, 2010, Application No. PCT/US2010/033235, Filed Date: Apr. 30, 2010, pp. 9.

Chinese Official Action dated Dec. 10, 2013 in Chinese Application No. 201080020008.4.

"Gobinder2006 New Features", [retrieved on Feb. 27, 2009] from http://www.gobinder.com/pdffiles/GoBinder%202006 %20What's% 20New.pdf, Agilix, 2 Pages, pp. 1-2.

"NoteFinder 0.6 Status", [retrieved on Feb. 27, 2009] from http://notefinder.co.cc/doku.php, 2 pages, p. 2.

"NoteScribe: The Premier Note-Taking Software for School, Business, and Home", [retrieved on Feb. 27, 2009] from http://www.notescribe.neU default.aspx, 8 pages, pp. 1-8.

"Glossary—Group Notebook", Dec. 5, 2008, Online Notebook—Expo6.Springnote.com, [retrieved on Feb. 27, 2009] from http://expo6.springnote.com/pages/2240816, 15 pages, p. 6.

Australian Official Action dated Mar. 11, 2014 in Australian Application No. 2010242832.

Japanese Official Action dated Feb. 19, 2014 in Japanese Application No. 2012-508791.

Hiroyuki Nakatsuji "Learn differences between wired and wireless LANs from differences between their protocols," Published on: Jan. 2007, Network World, v. 12, No. 1, pp. 76-81.

Russian Official Action dated Apr. 3, 2014 in Russian Application No. 2011144132.

European Official Action dated Jan. 17, 2014 in European Application No. 10770443.9.

Chinese Official Action dated Dec. 20, 2012 in Chinese Application No. 201080020008.4.

Chinese Official Action dated Jun. 5, 2013 in Chinese Application No. 201080020008.4.

European Search Report dated Mar. 1, 2013 in European Application No. 10770443.9.

Australian Notice of Acceptance dated Apr. 29, 2014 in Australian Application No. 2010242832.

Office Action and Search Report in Taiwanse Patent Application No. 99108580; mailed on Mar. 2, 2015; 11 pages.

Office Action Issued in Israel Patent Application No. 215416, Mailed Date: Sep. 7, 2015, 7 Pages.

Russian Notice of Allowance dated Nov. 5, 2014 in Russian Application No. 2011144132.

Chinese Official Action dated Jun. 4, 2014 in Chinese Application No. 201080020008.4.

Japanese Official Action dated Oct. 30, 2014 in Japanese Application No. 2012-508791.

Abstract RU 2037875 C1 titled "Device for interface between computer and telephone communication line" published Jun. 19, 1995 in the name of Maksimenko et al.

Chinese Notice of Allowance dated Sep. 4, 2014 in Chinese Application No. 201080020008.4.

"Office Action Issued in European Patent Application No. 10770443.9", Mailed Date: Mar. 2, 2017, 7 Pages.

* cited by examiner

SHARED JOB SCHEDULING IN ELECTRONIC NOTEBOOK

BACKGROUND

Electronic virtual notebooks can be shared such that multiple users can open and edit concurrently. There are features of shared notebooks that can benefit from having tasks run periodically. These tasks, or jobs, usually need to be run only once and by only one client or machine with the shared notebook open. In some cases having more than one person or instance try to perform the same task can lead to unpredictable results or potentially corrupted data.

An example of a feature that utilizes a periodic job run is an HTML view of the notebook. For users that do not have the notebook client installed but access the notebook via a web browser, those users may want a read-only HTML view of the notebook content. For the HTML view to have any value the view must be updated periodically, and frequently if there are changes, but only by one client with the notebook program open. Additionally, the decision of which user running the notebook program will perform the job should be automatic and performed without user intervention or input.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a technique where a task or job can be published to a shared notebook and synchronization is performed by only one notebook client instance, thereby eliminating the need for user intervention and guaranteeing that only one instance of the notebook client performs the task.

The architecture can include a job tracking component associated with a shared electronic notebook for creating and maintaining tracking information of jobs processed against shared notebook information, and a scheduling component for synchronizing a new job by a client instance against the shared notebook information based on the tracking information. The client instance can be one of multiple client instances that can or are interacting with the shared electronic notebook.

The tracking information can be a file stored at a root level of a hierarchical data collection, where the hierarchical data collection represents the electronic notebook. The file includes properties related to a job that has been processed. The properties are updated as new jobs are processed. Job scheduling includes whole file updates and/or incremental updates to the shared notebook information.

The architecture can be applied to any storage mechanism that supports electronic notebooks, and also scales to any number of users. No user interaction is required, and processing occurs in the background.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
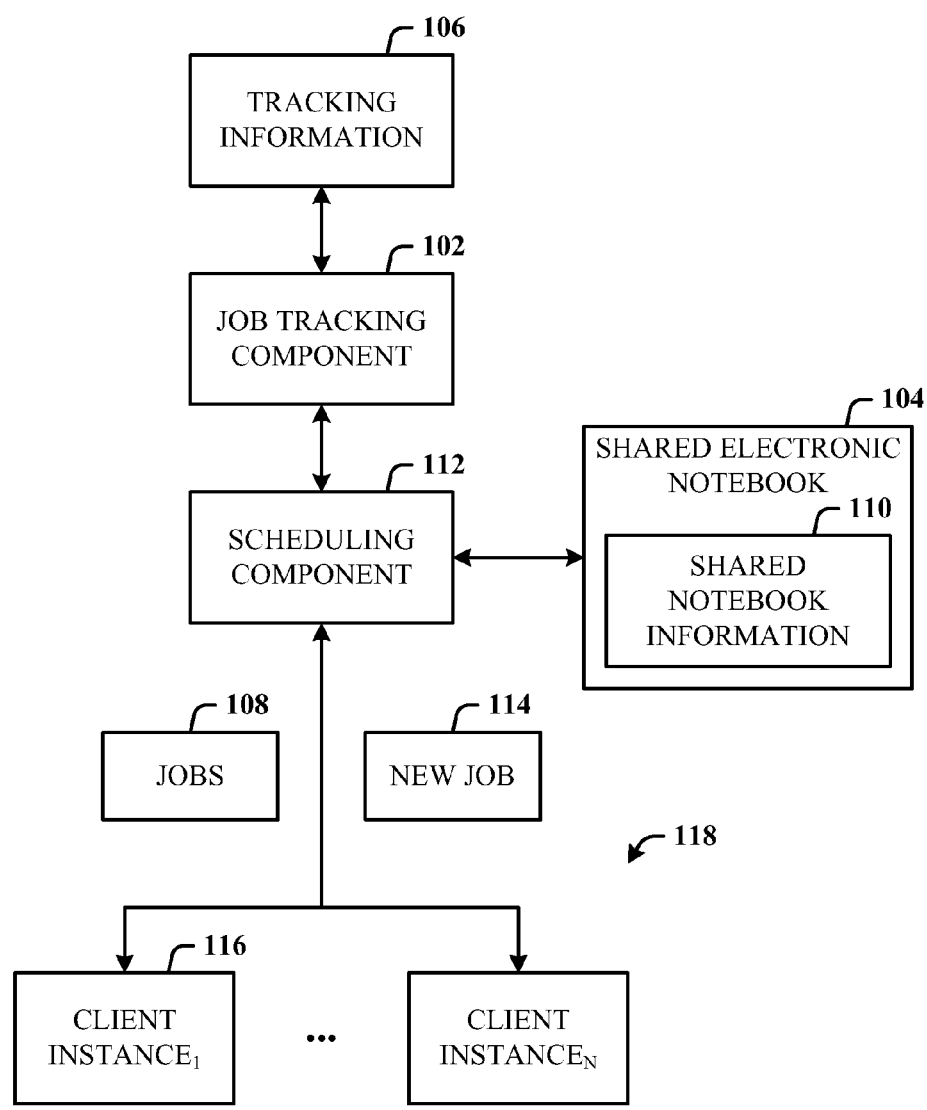
FIG. 1 illustrates a computer-implemented job scheduling system in accordance with the disclosed architecture.

The disclosed architecture allows many notebook clients to run scheduled jobs against a sharable electronic notebook without direct communication or coordination between the clients. A writeable file (also referred to as tracking information) is located in association with the sharable notebook and any notebook client can take a guaranteed atomic lock on the file during synchronization to the notebook. The file can store properties into the notebook at the root, and is used to synchronize jobs of the client instances. The properties can include the time (e.g., UTC-coordinated universal time) of the last run of that job and other properties that may be desired.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented job scheduling system 100 in accordance with the disclosed architecture. The system 100 includes a job tracking component 102 associated with a shared electronic notebook 104 for creating and maintaining tracking information 106 of jobs 108 processed against shared notebook information 110. The system 100 can also include a scheduling component 112 for synchronizing a new job 114 by a client instance 116 against the shared notebook information 110 based on the tracking information 106. The client instance 116 can be one of multiple client instances 118 that can or are interacting with the shared electronic notebook 104.

The tracking information 106 can be a file stored at a root level of a hierarchical data collection, where the hierarchical data collection represents the notebook. The file includes properties related to a job that has been processed. The properties are updated as new jobs are processed. The client instance 116 obtains atomic lock on the shared notebook information 110 when the scheduling component 112 synchronizes the new job 114 from the client instance 116 to the shared notebook information 110. The new job can be a whole file job that handles the whole file of the notebook or the new job is an incremental job such that only a portion of the data of the file is handled for synchronization.

An electronic notebook can be described as a collection of files and directories similar to files and directories in a file system. As a whole file mechanism, notebooks are stored as whole files. A single section of the notebook maps to a single file and that file is accessed as a whole file each time a change is made, independent of the size of the change. The whole file notebook maps notebook sections to files and notebook folders to directories. The root directory is the top of the notebook. An exemplary visual description of the view in an electronic is provided hereinbelow and how the notebook collection of files and directories translate to the file system.

An atomic file lock is processed in which access to the notebook whole file is obtained in a single operation that cannot be interrupted. Once the whole file lock is obtained, the notebook client instance is guaranteed to have exclusive access to the whole file—all other client instances are denied access while another client has the lock.

Figure 2:
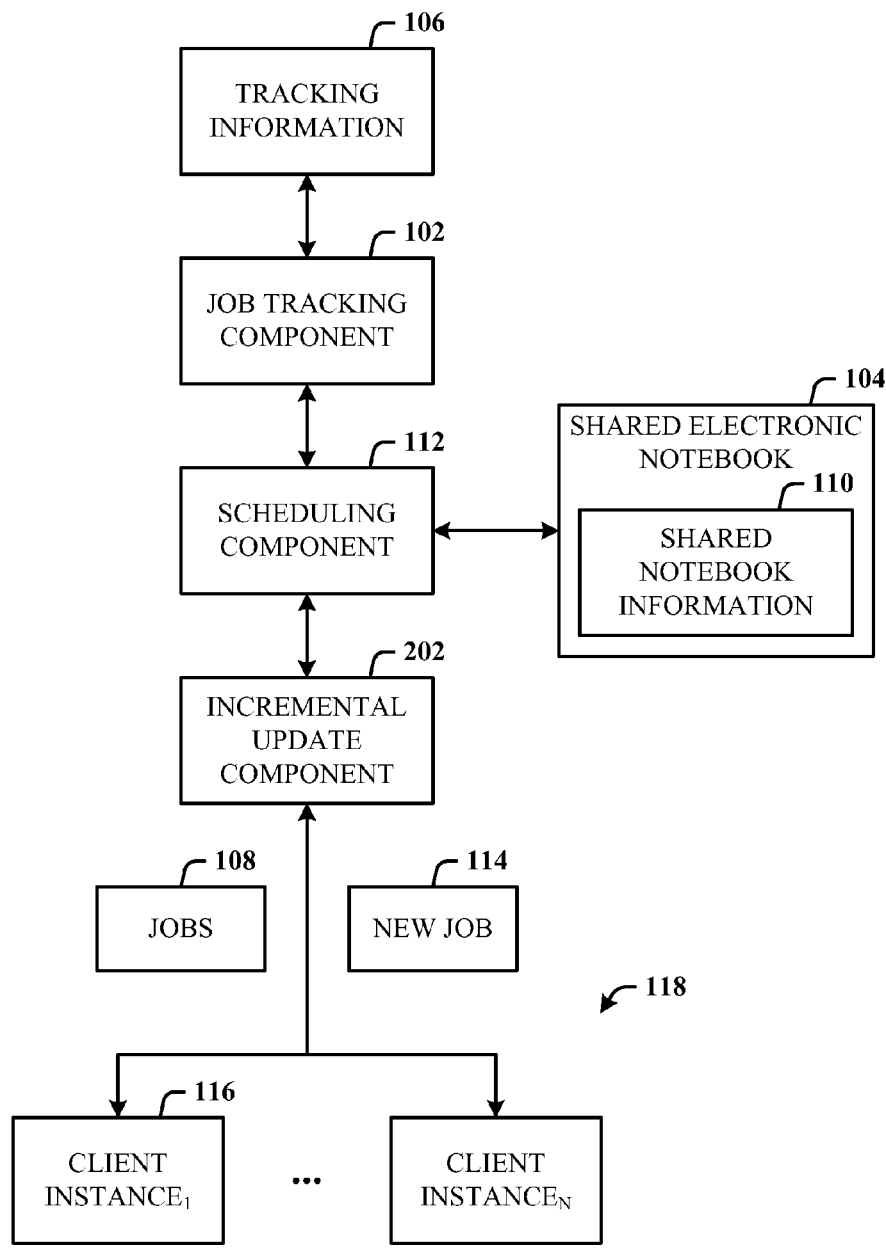
FIG. 2 illustrates an alternative embodiment of a job scheduling system.

FIG. 2 illustrates an alternative embodiment of a job scheduling system 200. The system 200 includes facilitates the incremental synchronization of client notebook data (jobs) via the implementation of an incremental update component 202. The jobs 108 can then be only the changes from one update to another (or delta changes), and not the whole file update described herein.

The system 200 can also include the job tracking component 102 associated with the shared electronic notebook 104 for creating and maintaining tracking information 106 of the jobs 108 (now incremental updates) processed against the shared notebook information 110. The system 200 also includes the scheduling component 112 for synchronizing the new job 114 (now a new incremental update) by the client instance 116 against the shared notebook information 110 based on the tracking information 106. The client instance 116 can be one of the multiple client instances 118 that can or are interacting with the shared electronic notebook 104.

As before, the tracking information 106 can be a file stored at the root level of a hierarchical data collection, where the hierarchical data collection represents the notebook 104. The tracking information 106, in the incremental embodiment, includes properties related to the jobs that have been processed. The properties of the tracking information 106 are updated as the new jobs are processed.

The jobs are incremental updates (also referred to as revisions) of a file to an increment-capable server instead of the whole file for every change the user makes. For example, if changing one letter in a text document and saving to a collaboration server, the entire text document would need to be uploaded in the whole file implementation. In contrast, the increment-compatible server accepts only a small packet of data describing the change(s) made. Clients do not use the atomic file lock described in the whole file implementation.

The revision used to describe the packet of changes that is sent in place of the whole file when a small document edit is made. All the revisions of a cell make up a page or a section when grouped together. A cell is a part of the document that makes sense to be on its own. For example, the smallest unit that is a cell can be a page, in contrast to the whole file notebook in which the smallest unit is a section (which is a file).

Put another way, the job scheduling system 200 comprises the job tracking component 102 associated with the shared electronic notebook 104 for creating and maintaining the tracking information 106 of jobs processed against the shared notebook information 110. The tracking information 106 is stored at the root level of a hierarchical data collection that represents the notebook 104, and the tracking information 106 includes properties related to a job that has been processed. The system 200 also includes a scheduling component 112 for synchronizing the new job 114 from the client instance 116 to the shared notebook information 110 based on the tracking information 106, the tracking information 106 includes time information of a last run of the new job 114.

The new job 114 can be a whole file job and the client instance 116 obtains file lock on the shared notebook information 110 when the scheduling component 112 synchronizes the whole file job to the shared notebook information 110. The scheduling component 112 adds random extra time to the new job 114 to mitigate attempts by client instances at concurrent job execution.

The system 200 can further comprise the incremental update component 202 for receiving the new job 114 as an incremental update to the shared notebook information 110. The new job is a packet of changes related only to data that is changed.

Figure 3:
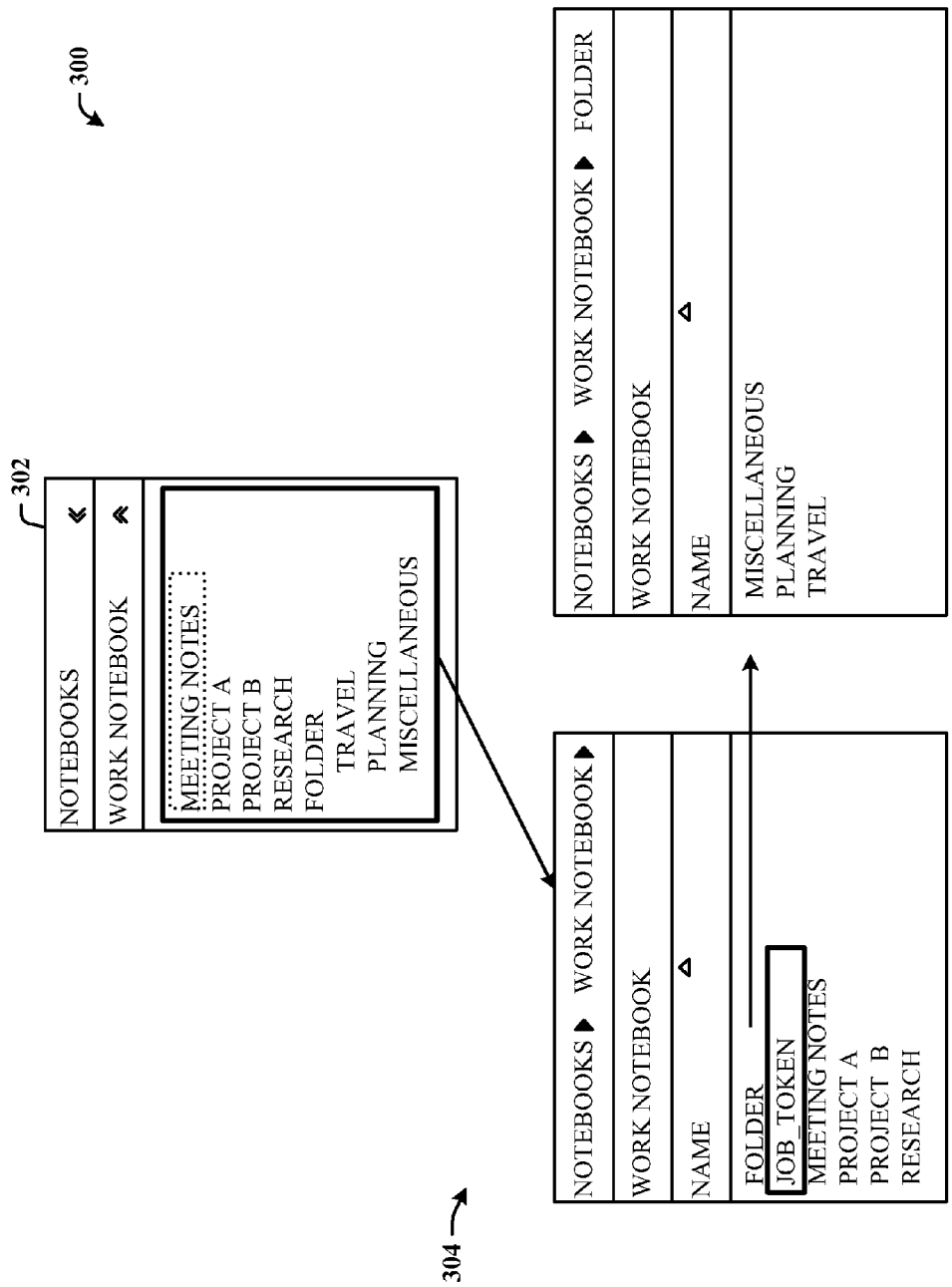
FIG. 3 illustrates a visual description of an example of a shared virtual electronic notebook architecture for job scheduling.

FIG. 3 illustrates a visual description 300 of an example of a shared virtual electronic notebook architecture for job scheduling. A virtual electronic notebook comprises a collection of files and directories just like files and directories in a file system. Whole file notebooks map notebook sections to files and notebook folders to directories. The root directory is the top of the notebook. The visual description 300 shows one example of a notebook user interface view 302, and how the view 302 translates to files and folders in a file system 304 below. The view 302 shows notebooks that include a Work Notebook that comprises Meeting Notes, Project A, Project B, Research, and a Folder. The Folder expands to include notebook files named Travel, Planning, and Miscellaneous.

For descriptive purposes only, the tracking information is included at the root level as a job_token file in the system file list. The disclosed architecture places a file at the root level of the notebook that stores properties. The job_token file is used to synchronize jobs and also track, by way of the properties, the time (e.g., UTC) of the last run of that job and any other properties that may be desired.

For whole file implementations, the client instance places an uninterruptible atomic file lock on the job_token file when synchronization occurs. Once obtained, the client instance is guaranteed to have exclusive access.

The disclosed architecture provides multiple notebook clients the ability to run scheduled jobs against a shared notebook without direct communication or coordination between the clients.

Figure 4:
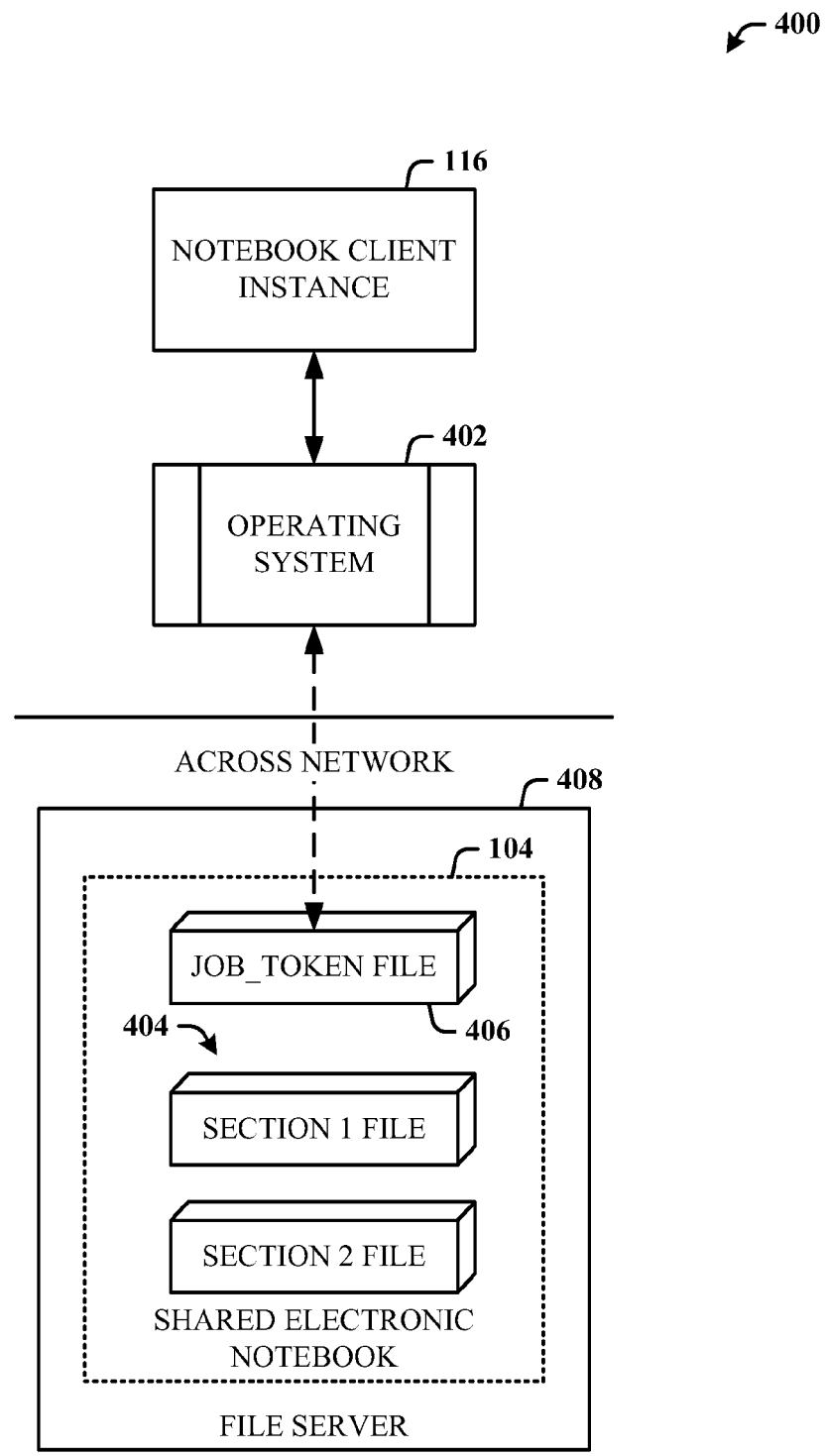
FIG. 4 illustrates a whole file notebook job scheduling system in accordance with one embodiment of the disclosed architecture.

FIG. 4 illustrates a whole file notebook job scheduling system 400 in accordance with one embodiment of the disclosed architecture. The system 400 includes the notebook client instance 116 operating through a client-based operating system 402 to interact with the shared notebook 104.

The shared notebook 104 is represented as comprising two section files 404, although other files and folders can be employed. Additionally, a tracking information file 406 (denoted job_token file) can be created, stored, and maintained in the root level of the shared notebook files 404. As illustrated, the shared notebook 104 is stored and maintained on a file server 408, which can be any LDAP (lightweight directory access protocol) file server, for example.

Figure 5:
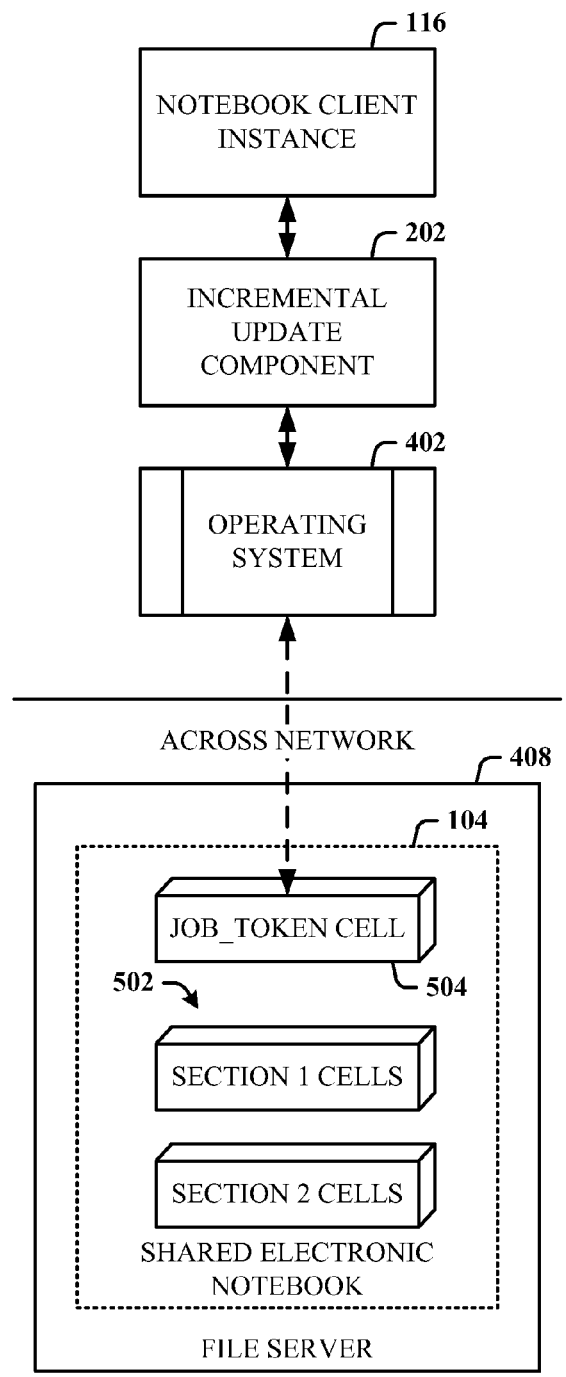
FIG. 5 illustrates a cell-based electronic notebook job scheduling system in accordance with one embodiment of the disclosed architecture.

FIG. 5 illustrates a cell-based electronic notebook job scheduling system 500 in accordance with one embodiment of the disclosed architecture. The system 500 includes the notebook client instance 116 operating through the incremental update component 202 to the client-based operating system 402 to interact with the shared notebook 104 on the file server 408.

Here, the shared notebook 104 is represented as comprising two section cells 502, although other cells can be employed. Additionally, a tracking information cell 504 (denoted job_token cell) can be created, stored, and maintained in the root level of the shared notebook cells 502. As illustrated, the shared notebook 104 can be stored and maintained on the file server 408, which can be any LDAP (lightweight directory access protocol) file server, for example.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
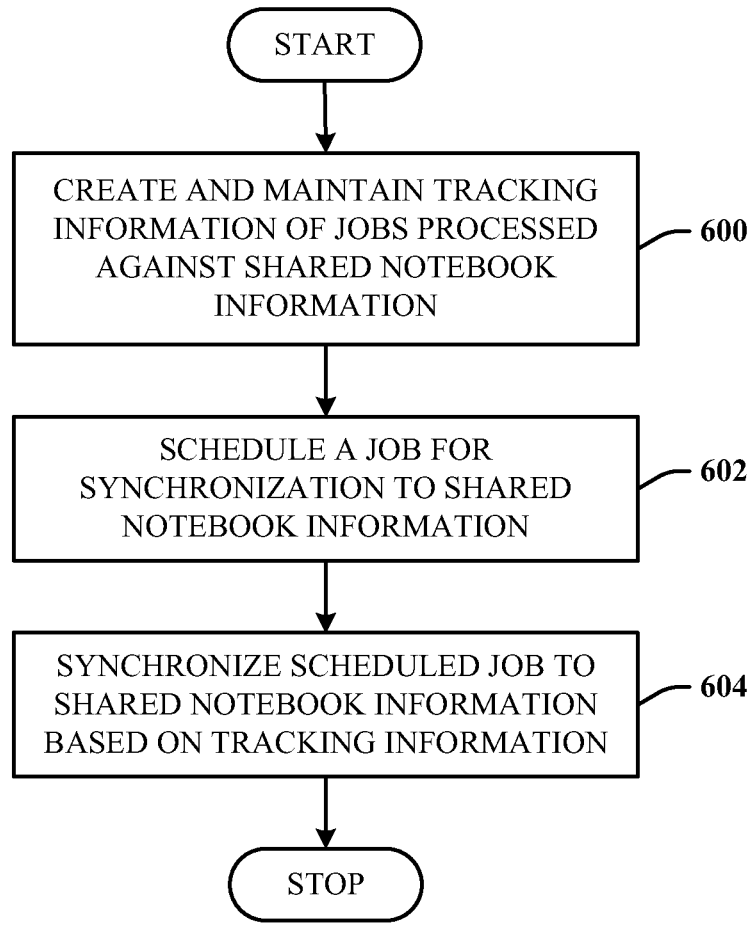
FIG. 6 illustrates a method of job scheduling.

FIG. 6 illustrates a method of job scheduling. At 600, tracking information of jobs processed against shared notebook information is created and maintained. At 602, a job is scheduled for synchronization to the shared notebook information. At 604, the scheduled job is synchronized to the shared notebook information based on the tracking information.

Figure 7:
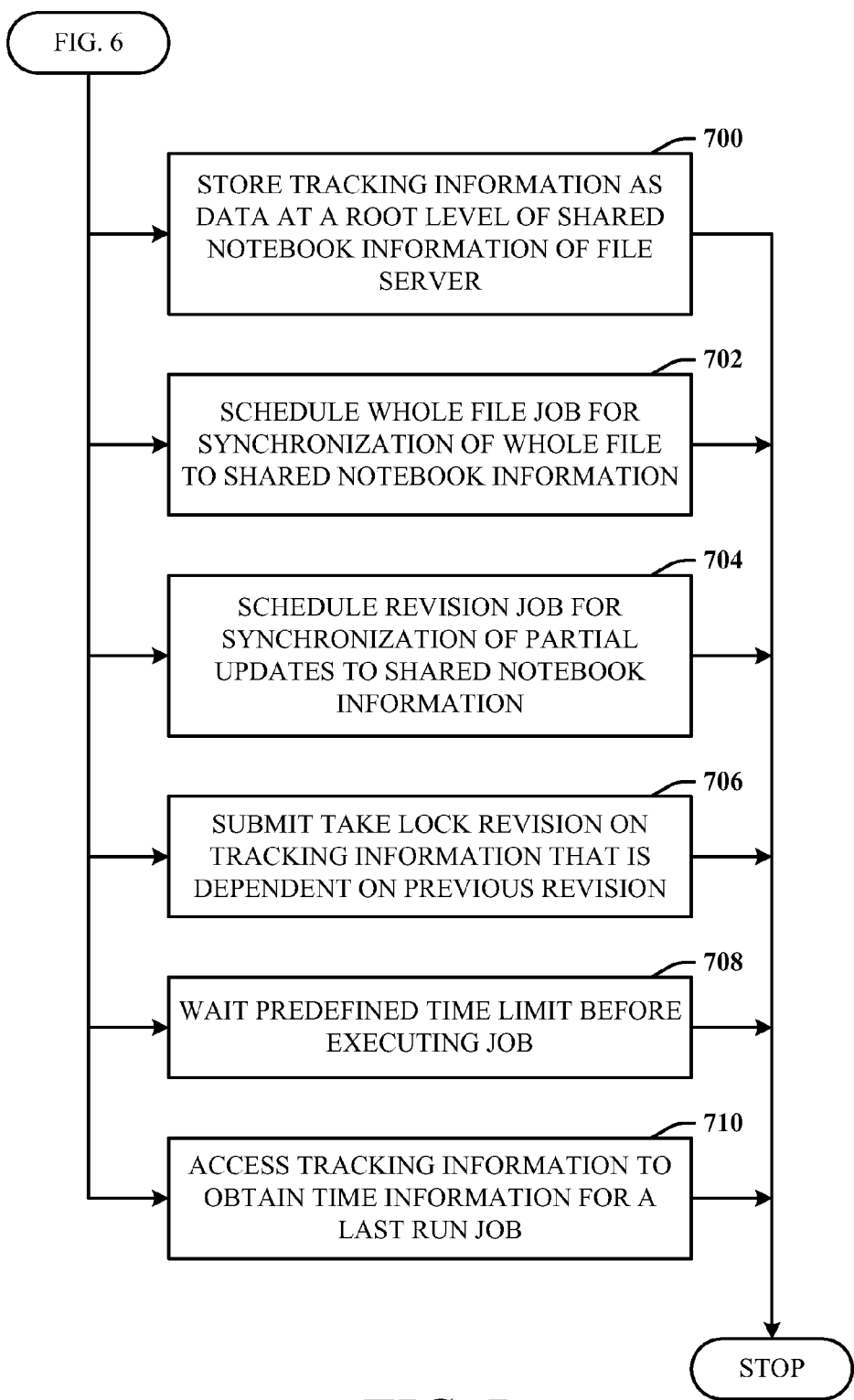
FIG. 7 illustrates additional aspects of the method of FIG. 6.

FIG. 7 illustrates additional aspects of the method of FIG. 6. At 700, the tracking information is stored as data at a root level of the shared notebook information of a file server. At 702, a whole file job is scheduled for synchronization of a whole file to the shared notebook information. At 704, a revision job is scheduled for synchronization of partial updates to the shared notebook information. At 706, a take lock revision on the tracking information is submitted that is dependent on a previous revision. At 708, a predefined time limit is waited before executing the job. At 710, the tracking information is accessed to obtain time information for a last run job.

Figure 8:
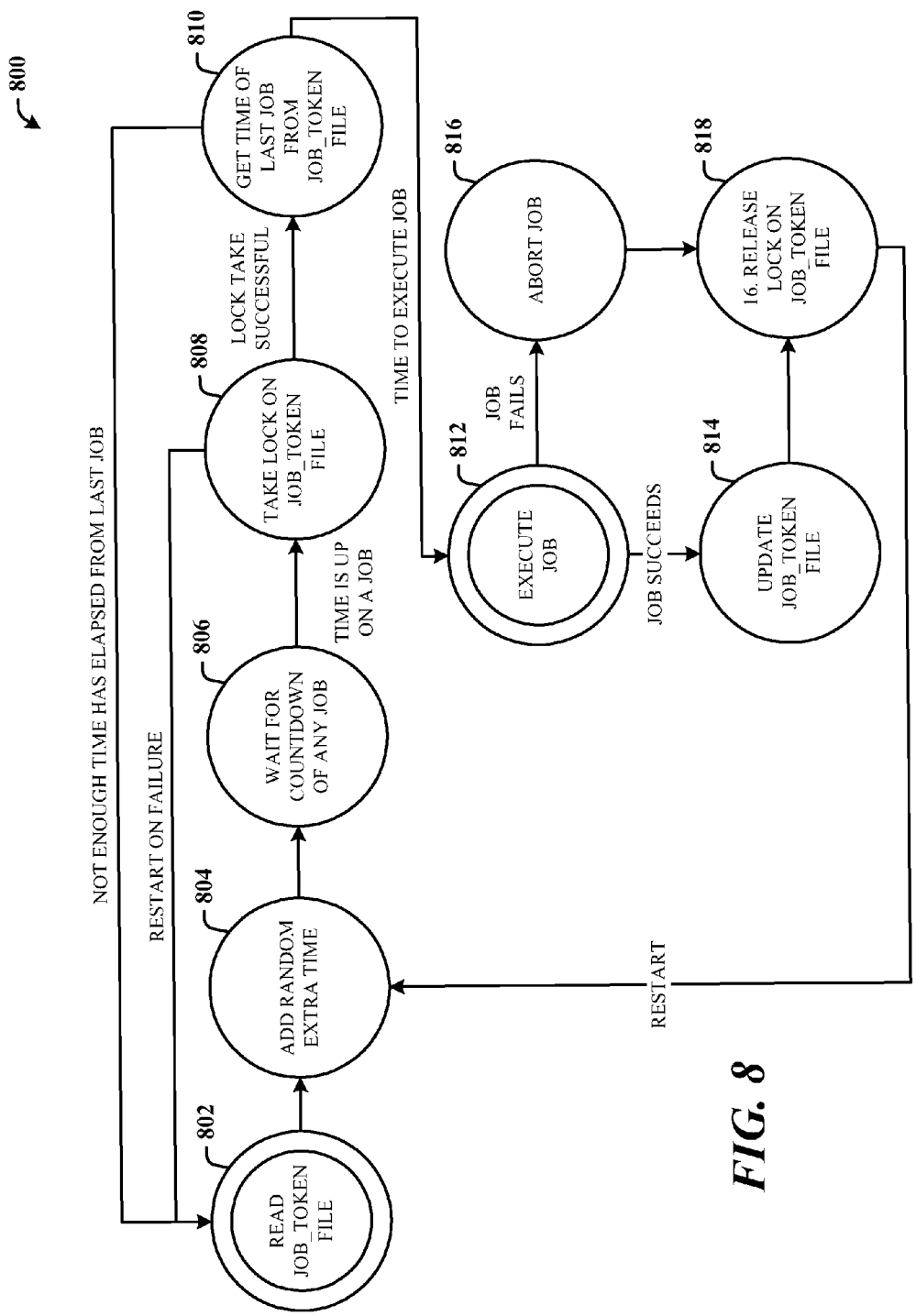
FIG. 8 illustrates a state diagram that represents job scheduling and execution for whole file jobs.

FIG. 8 illustrates a state diagram 800 that represents job scheduling and execution for whole file jobs. At 802, the tracking information in the form of the job_token file is read for processing a job. The file is read from a server source location and the time of the last executed jobs is obtained, if there were any previously processed jobs. At 804, random extra time is added to scheduling of the job. The last executed jobs are remembered (or use a default value) and the random extra time added. This to mitigate or prevent clients from attempting to execute jobs at the same time. At 806, a background wait state is entered waiting for any of the job times to exceed a predefined limit. A countdown is performed that eventually matches the time for processing the job. This allows jobs to be run at different times or frequencies (e.g., one job at once per hour and another job at once per day).

If the time is up for a job, flow is to the next state 808, where a file lock is taken on the job_token file in the root of the notebook. If the lock take fails, flow is back to 802. If lock take succeeds, another copy of the job-token file is retrieved from the server. This is because another job had obtained lock and new tracking information is obtained. At 810, the time of the last run job is obtained from the job_token file to ensure the job was not run when getting a lock. If not enough time has passed since the last job was run, the lock is released and flow is back to 802.

If the job has not been run, flow is from 810 to 812 to execute the job. If job execution succeeds, flow is to 814 to update the job_token file. If job execution fails, flow is from 812 to 816 to abort the job. In either case of job execution success or failure, flow is to 818 to release the lock on the job_token file. Flow is then from 818 back to 804 restart and add random extra time.

Figure 9:
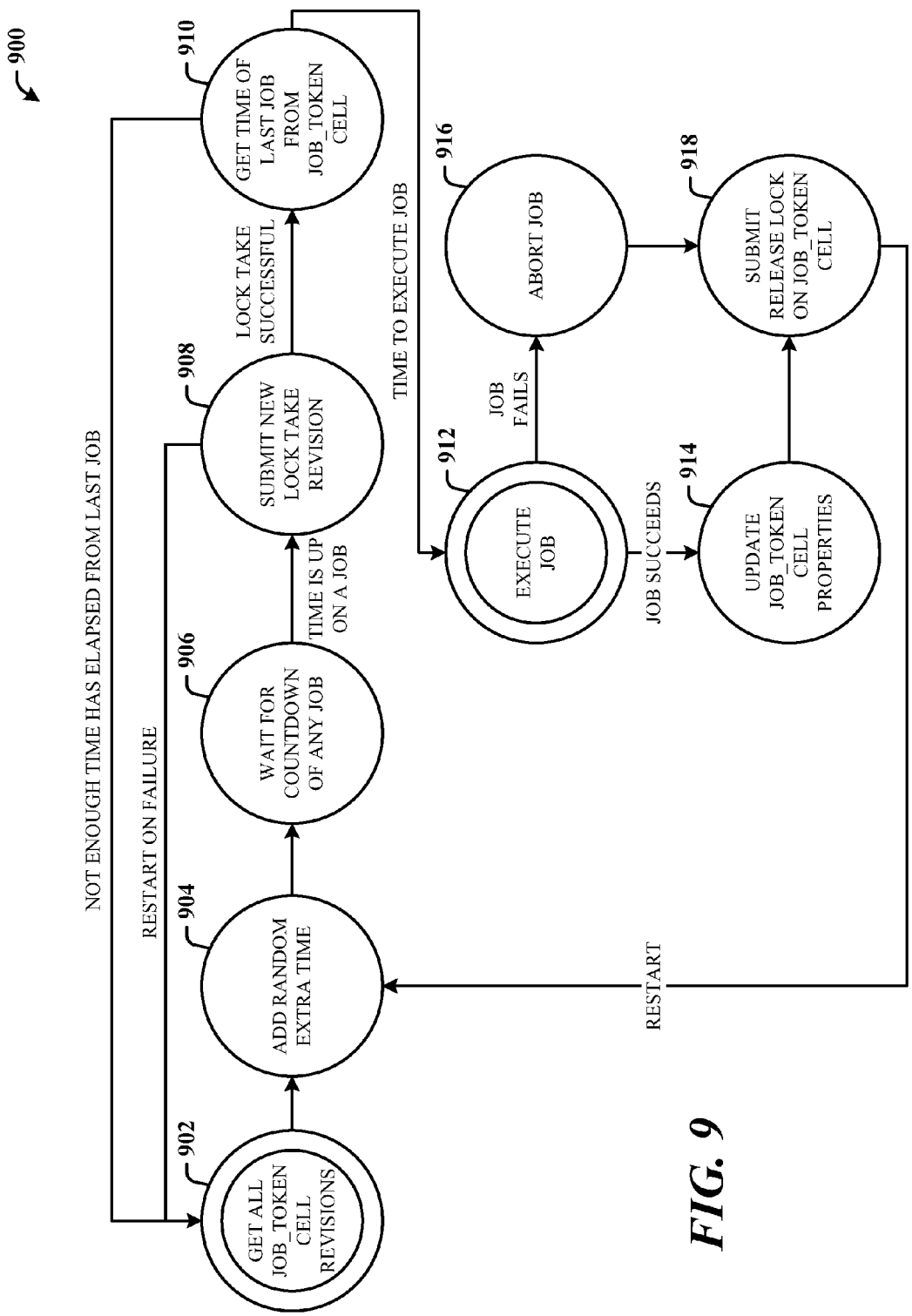
FIG. 9 illustrates a state diagram that represents job scheduling and execution for revision jobs.

FIG. 9 illustrates a state diagram 900 that represents job scheduling and execution for revision jobs. At 902, all the job_token cell revisions are requested from the shared notebook of the file server. In these revisions will be the time of the last job and whether any other client has a current lock on the cell. The file is read from a server source location and the time of the last executed jobs is obtained, if there were any previously processed jobs. At 904, random extra time is added to scheduling of the job. The last executed jobs are remembered (or use a default value) and the random extra time added. This to prevent clients from attempting to execute jobs at the same time. At 906, a background wait state is entered waiting for any of the job times to exceed a predefined limit. A countdown is performed that eventually matches the time for processing the job. This allows jobs to be run at different times or frequencies (e.g., one job at once per hour and another job at once per day).

If the time is up for a job, flow is to the next state 908, to submit a take lock revision that is dependent on a previous revision. This ensures that if the latest revision in the cell changes (which generally means another client has taken a lock), this current take lock will fail. If the lock take fails, flow is back to 902. If lock take succeeds, flow is from 908 to 910 where a copy of all the cell revisions is obtained from the server. At 910, the time of the last run job is obtained from the job_token cell to ensure the job was not run when getting a lock. If not enough time has elapsed since the last job was run, the lock is released and flow is from 910 back to 902.

If the time has come for job execution, flow is from 910 to 912 to execute the job. If job execution succeeds, flow is to 914 to update the job_token cell properties. The time the job was run is updated in the job_token cell by submitting a new revision for that property. If job execution fails, flow is from 912 to 916 to abort the job. In either case of job execution of success or failure, flow is to 918 to release the lock on the job_token cell by submitting a release lock revision. Flow is then from 918 back to 904 restart and add random extra time.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
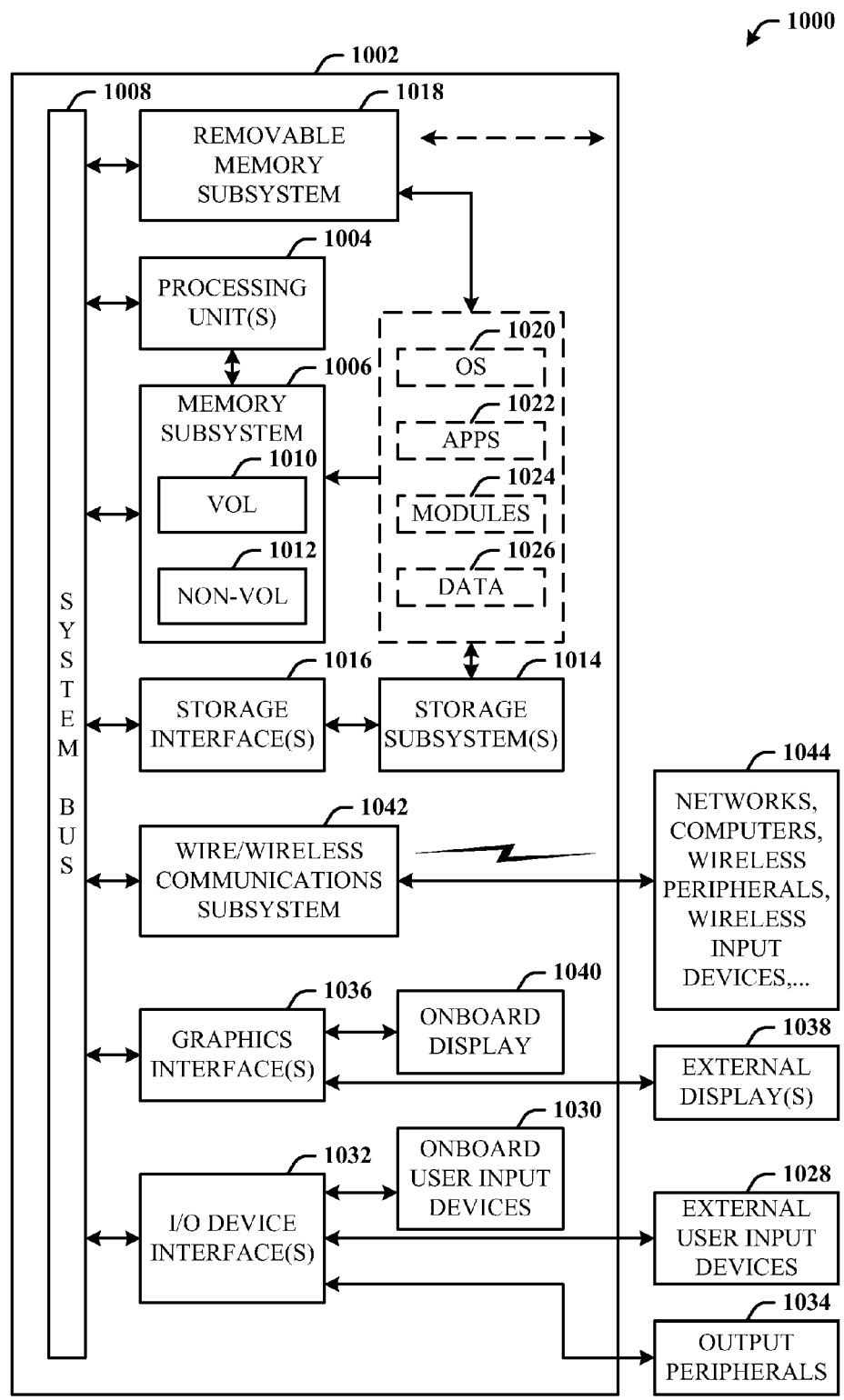
FIG. 10 illustrates a block diagram of a computing system operable to execute jobs for electronic notebooks in accordance with the disclosed architecture.

Referring now to FIG. 10, there is illustrated a block diagram of a computing system 1000 operable to execute jobs for electronic notebooks in accordance with the disclosed architecture. In order to provide additional context for various aspects thereof, FIG. 10 and the following discussion are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the memory subsystem 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes storage subsystem(s) 1014 and storage interface(s) 1016 for interfacing the storage subsystem(s) 1014 to the system bus 1008 and other desired computer components. The storage subsystem(s) 1014 can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

Where the computer 1002 is a client-based machine, the one or more application programs 1022, other program modules 1024, and program data 1026 can include the client instances 118, jobs 108, and new job 114 of FIG. 1, the incremental update component 202 of FIG. 2, the view 302 of FIG. 3, the operating system 403 of FIG. 4, and one or more of the steps illustrated in the flow charts and state diagrams of FIGS. 6-9, for example.

Where the computer 1002 is a server-based machine, the one or more application programs 1022, other program modules 1024, and program data 1026 can include the job tracking component 102, tracking information 106, scheduling component 112, the jobs 108, new job 114, shared electronic notebook 104 and shared notebook information 110 of FIG. 1, the file system 304 of FIG. 3, the file server 408, the shared notebook files 404 and tracking information file 406 of FIG. 4, the shared notebook files 502 and tracking information cell 504 of FIG. 5, and one or more of the steps illustrated in the flow charts and state diagrams of FIGS. 6-9, for example.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Computer readable media can be any available media that can be accessed by the computer 1002 and includes volatile and non-volatile media, removable and non-removable media. For the computer 1002, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP) using logical connections via a wired/wireless communications subsystem 1042 to one or more networks and/or other computers. The other computers can include workstations, servers, routers, personal computers, microprocessor-based entertainment appliance, a peer device or other common network node, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or has other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 11:
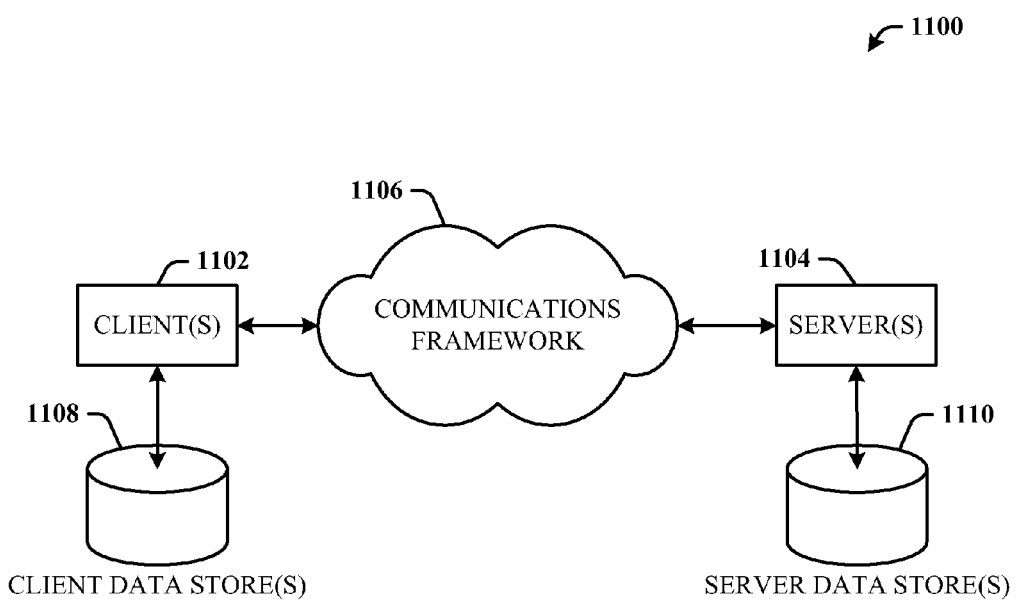
FIG. 11 illustrates a schematic block diagram of a computing environment for virtual electronic notebook job scheduling and synchronization.

Referring now to FIG. 11, there is illustrated a schematic block diagram of a computing environment 1100 for virtual electronic notebook job scheduling and synchronization. The environment 1100 includes one or more client(s) 1102. The client(s) 1102 can be hardware and/or software (e.g., threads, processes, computing devices). The client(s) 1102 can house cookie(s) and/or associated contextual information, for example.

The environment 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The environment 1100 includes a communication framework 1106 (e.g., a global communication network such as the Internet) that can be employed to facilitate communications between the client(s) 1102 and the server(s) 1104.

Communications can be facilitated via a wire (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented job scheduling system, comprising:
    at least one computer executing a job tracking component associated with a shared electronic notebook for creating and maintaining tracking information for jobs processed against shared notebook information, the shared electronic notebook comprising a root directory containing a collection of files and directories, wherein notebook sections are mapped to the files, wherein notebook folders are mapped to the directories, wherein the tracking information is stored as a job file in the root directory of the shared electronic notebook, and wherein the tracking information comprises properties related to a change by a user made to at least a portion of a file in the shared electronic notebook; and at least one computer executing a scheduling component for synchronizing a plurality of job files stored in the root directory of the shared electronic notebook against the shared notebook information based on the tracking information, the scheduling component configured to
retrieve a copy of any earlier job files,
determine a time of a last run job file from the any earlier job files,
wait for the time of the last run job file to exceed a predefined limit to ensure a time for an atomic lock on the last run job file has expired,
attempt to take an atomic lock on a current job file in the root directory of the shared electronic notebook in response to determining that the time of the last run job file exceeds the predefined limit, and
in response to taking the atomic lock, synchronize the current job file to the shared notebook information.

2. The system of claim 1, wherein the current job file comprises a change to a whole file in the shared electronic notebook.

3. The system of claim 1, wherein the current job file comprises an incremental change to the at least a portion of a file in the shared electronic notebook.

4. The system of claim 1, further comprising at least one computer executing an incremental update component for receiving the current job file as an incremental update to the shared notebook information.

5. The system of claim 4, wherein the current job for an incremental update comprises a packet of changes related only to data within a portion of a file that was changed.

6. The system of claim 1, wherein the tracking information includes time information of a last run of the current job file.

7. The system of claim 1, wherein the scheduling component is further configured to add a random extra time to the current job file to mitigate attempts at concurrent job execution by multiple clients.

8. The system of claim 1, where the predefined limit comprises a time for processing the current job file.

9. A computer-implemented method of job scheduling associated with a shared electronic notebook, comprising:
creating and maintaining tracking information for jobs processed against shared notebook information, the shared electronic notebook comprising a root directory containing a collection of files and directories, wherein notebook sections are mapped to the files, wherein notebook folders are mapped to the directories, and wherein the tracking information is stored as data at the root directory of the shared notebook information; and scheduling a job for synchronization to the shared notebook information by
retrieve a copy of any earlier job files,
determine a time of a last run job file from the any earlier job files,
waiting for the time of the last run job file to exceed a predefined limit for the expiration of a time period of a previous take lock revision,
attempting to take an atomic lock on a current job file in the root directory of the shared electronic notebook in response to determining that time of the last run job file exceeds the predefined limit, and
in response to taking the atomic lock, then synchronizing the current job file to the shared notebook information.

10. The method of claim 9, further comprising scheduling a whole file job for synchronization of a whole file to the shared notebook information.

11. The method of claim 9, further comprising scheduling a revision job for synchronization of partial updates to the shared notebook information.

12. The method of claim 9, further comprising accessing the tracking information to obtain take lock revision time information for a last run job.

13. The method of claim 9, where the predefined limit comprises a time for processing the scheduled job.

14. One of an optical disk, a magnetic storage device or a solid state storage device having computer-executable instructions stored thereon which, when executed by a computer, cause the computer that executes a job scheduling function associated with a shared electronic notebook to:
create and maintain tracking information for jobs processed against shared notebook information, the shared electronic notebook comprising a root directory containing a collection of files and directories, wherein notebook sections are mapped to the files, wherein notebook folders are mapped to the directories, wherein the tracking information is stored as data at the root directory of the shared notebook information; and
schedule a job for synchronization to the shared notebook information by
retrieve a copy of any earlier job files,
determine a time of the last run job file from the any earlier job files,
waiting for the time of the last run job file to exceed a predefined limit for the expiration of a time period of a previous take lock revision,
attempting to take an atomic lock on a current job file in the root directory of the shared electronic notebook in response to determining that time of the last run job file exceeds the predefined limit, and
in response to taking the atomic lock, then synchronizing the current job file to the shared notebook information.

* * * * *